United States Patent
Nast et al.

(10) Patent No.: US 10,536,184 B2
(45) Date of Patent: *Jan. 14, 2020

(54) SIGNAL COUPLING DEVICE AND METHOD FOR OPERATING A SIGNAL COUPLING DEVICE

(71) Applicant: LAIRD DABENDORF GMBH, Dabendorf (DE)

(72) Inventors: Helmut Nast, Berlin (DE); Raimo Jacobi, Berlin (DE); Marcus Weigelt, Zossen (DE)

(73) Assignee: Laird Dabendorf GmbH, Dabendorf (DE)

( * ) Notice: Subject to any disclaimer, the term of this patent is extended or adjusted under 35 U.S.C. 154(b) by 35 days.

This patent is subject to a terminal disclaimer.

(21) Appl. No.: 16/139,229

(22) Filed: Sep. 24, 2018

(65) Prior Publication Data

US 2019/0028135 A1    Jan. 24, 2019

Related U.S. Application Data

(63) Continuation of application No. 15/326,723, filed as application No. PCT/EP2015/066238 on Jul. 16, 2015, now Pat. No. 10,084,505.

(30) Foreign Application Priority Data

Jul. 17, 2014    (DE) .................. 10 2014 213 933

(51) Int. Cl.
*H04M 1/00* (2006.01)
*H04B 1/403* (2015.01)
*H04L 5/14* (2006.01)

(52) U.S. Cl.
CPC ............... *H04B 1/406* (2013.01); *H04L 5/14* (2013.01)

(58) Field of Classification Search
CPC .......... H04B 1/406; H04L 5/14; H04W 88/06; H04W 48/18

(Continued)

(56) References Cited

U.S. PATENT DOCUMENTS

| 7,970,065 B2 | 6/2011 | Horiguchi | H04B 7/10 370/333 |
| 8,055,222 B2 | 11/2011 | Nanni | H04B 1/406 455/188.1 |

(Continued)

FOREIGN PATENT DOCUMENTS

| CN | 1694441 A | 11/2005 |
| DE | 19536640 A1 | 3/1997 |

(Continued)

*Primary Examiner* — Sonny Trinh
(74) *Attorney, Agent, or Firm* — Laurence A. Greenberg; Werner H. Stemer; Ralph E. Locher

(57) ABSTRACT

A method operates a signal coupling device. The signal coupling device contains at least one signal branch section which is or can be connected to a terminal-side interface of the signal coupling device using signaling. At least one signal property of a signal applied to the at least one signal branch section is determined. A signal type is determined on the basis of the at least one signal property. A time duplexing signal or a frequency duplexing signal is determined as the signal type. A signal-type-specific connection is established between the terminal-side interface and an antenna-side interface of the signal coupling device.

20 Claims, 4 Drawing Sheets

(58) Field of Classification Search
USPC .......................................... 455/552.1, 115.1
See application file for complete search history.

(56) References Cited

U.S. PATENT DOCUMENTS

| | | |
|---|---|---|
| 8,380,136 B2 | 2/2013 | Nast et al. |
| 8,718,052 B2 | 5/2014 | Nast et al. |
| 2006/0109931 A1 | 5/2006 | Asai et al. |
| 2015/0215763 A1* | 7/2015 | Ro ................ H04W 8/005 |
| | | 455/426.1 |
| 2016/0014780 A1* | 1/2016 | Horisaki ............ H04W 16/14 |
| | | 370/315 |
| 2017/0208482 A1 | 7/2017 | Yamazaki ............ H04W 16/32 |

FOREIGN PATENT DOCUMENTS

| | | |
|---|---|---|
| DE | 102007004911 A1 | 8/2008 |
| DE | 102009027358 A1 | 1/2011 |
| EP | 1655872 A1 | 5/2006 |

\* cited by examiner

SIGNAL COUPLING DEVICE AND METHOD FOR OPERATING A SIGNAL COUPLING DEVICE

CROSS-REFERENCE TO RELATED APPLICATION

This application is a continuation of patent application Ser. No. 15/326,723, filed Jan. 17, 2018; which was a continuation, under 35 U.S.C. § 120, of International application No. PCT/EP2015/066238, filed Jul. 16, 2015; this application also claims the priority, under 35 U.S.C. § 119, of German patent application No. DE 10 2014 213 933.3, filed Jul. 17, 2014; the prior applications are herewith incorporated by reference in their entireties.

BACKGROUND OF THE INVENTION

Field of the Invention

The invention relates to a method for operating a signal coupling device and to a signal coupling device.

The prior art discloses signal coupling devices that are used for connecting a terminal, particularly a mobile telephone, to a terminal-external antenna for signaling purposes. Such signal coupling devices can be provided particularly in vehicles in order to connect a terminal in a vehicle interior to a vehicle antenna for signaling purposes. This can firstly produce a high signal quality and secondly decrease energy consumption for operation of the terminal. Such signal coupling devices may in this case be designed such that signals received by the terminal-external antenna and transmitted to the terminal and/or signals sent by the terminal and transmitted to the terminal-external antenna can be processed and/or influenced, particularly also amplified.

Published, non-prosecuted German patent application DE 10 2009 027 358 A1 discloses a method and a function group for connecting signal arms of a circuit arrangement for processing and/or influencing signals in radio communication, according to which at least the transmission arms of the relevant circuit arrangement are switched to an active or inactive state for radio communication on the basis of the presence of a transmission signal from a terminal that is operated with said circuit arrangement and that operates in at least one of multiple frequency bands supported by the circuit arrangement. Further, the transmission paths deactivated in a basic state of the circuit arrangement, which differ from one another at least insofar as they are designed for transmitting transmission signals in different frequency bands, are successively checked in time periods for the presence of a transmission signal from the respective terminal operated with the circuit arrangement. If such a transmission signal is present, only the transmission path relevant to the frequency band of said transmission signal is activated and continues to be checked for the presence of a transmission signal. Further, this transmission path that is then continuously checked for the presence of the transmission signal is deactivated again in the absence of the transmission signal and, following deactivation of said transmission path, the checking of all transmission paths in time periods for the presence of a transmission signal is continued.

Various signal types that can be used for bidirectional communication are additionally known. In particular, what are known as time division duplex signals and frequency division duplex signals are known. In the case of time division duplex signals, transmission signals and received signals are transmitted at the same or at different frequency (frequencies) but at separate times from one another, particularly in different time slots. As such, time division duplex signals can be transmitted in a simplex mode, wherein the transmission signal and the received signal are transmitted at the same frequency. Alternatively, time division duplex signals can be transmitted in a semi-duplex mode, wherein the transmission signals and received signals are transmitted at different frequencies. By way of example, time division duplex signals for what are known as uplink signals and downlink signals can be transmitted on different frequencies.

In the case of frequency division duplex signals, transmission signals and received signals are transmitted at different frequencies. This allows e.g. a device to be able to send and receive at the same time.

It may be that time division duplex signals and frequency division duplex signals use the same frequency ranges for communication. This in turn can mean that a specific signal arm of the signal coupling device is provided for transmitting both time division duplex signals and frequency division duplex signals. This can have the following disadvantages, however. Particularly in the case of frequency division duplex signals, sending may require continual amplification of the signal transmitted via the signal arm. When a time division duplex signal is transmitted via this signal arm, however, only sending in one transmission time slot requires amplification of the signal. Hence, a time division duplex signal results in unnecessarily increased energy consumption. Further, a signal arm for transmitting frequency division duplex signals requires what is known as a duplexing filter in order to isolate transmission and reception parts of the signal for signaling purposes. These disadvantageously attenuate a time division duplex signal transmitted via this signal arm, however. A disadvantage that results is also that the duplexing filters need to be designed for the levels needed for time division duplex signals, making the duplexing filters expensive and increasing their installation space requirement.

SUMMARY OF THE INVENTION

Therefore, the technical problem arises of providing a method for operating a signal coupling device and also a signal coupling device that allow transmission of time division duplex signals and frequency division duplex signals in at least partially the same frequency ranges, but at the same time reduce an energy consumption, ensure a desired transmission quality and reduce an installation space requirement and also costs.

The solution to the technical problem is provided by the subjects having the features of claims the main claims. Further advantageous configurations of the invention arise from the subclaims.

It is a fundamental concept of the invention to determine a signal type of a signal present on a signal arm of the signal coupling device, wherein the signal type is taken as a basis for setting a signal arm profile of a connection between a terminal-end interface and an antenna-end interface and/or, if the signal that is present is a time division duplex signal, signal-type-specific control of a mode of at least one signal processing device is affected.

The proposal relates to a method for operating a signal coupling device. The signal coupling device can be used to connect particularly a terminal, particularly a mobile telephone, to a terminal-external antenna for signaling purposes. The signal coupling device may in this case be arranged in a vehicle, particularly a motor vehicle. The terminal-external antenna may in this case be particularly a vehicle antenna. The signal coupling device may further be particularly part of a mobile radio amplification apparatus or comprise a mobile radio amplification apparatus.

Within the context of this invention, a connection can denote a connection for signaling purposes. This may be particularly a DC and/or inductive and/or capacitive connection. Preferably, a connection is a DC connection. Within the signal coupling device, preferably only DC connections are used as connections for signaling purposes. The connection of the signal coupling device to the terminal may, however, also be an inductive connection or a capacitive connection. Within the context of this invention, the term connection also covers a signal coupling or coupling, which will be explained in even more detail below.

The signal coupling device comprises at least one signal arm section that is connected or connectable to the terminal-end interface for signaling purposes. In this case, the terminal-end interface denotes an interface via which a connection for signaling purposes can be set up between the signal coupling device and the terminal. The terminal-end interface can, in this case, allow bidirectional transmission of signals. The signal arm section is used in this case for setting up a connection for signaling purposes and/or for transmitting a signal. The signal arm section may be in the form of a conductor or conductor track, for example.

Further, the signal coupling device can comprise an antenna-end interface. This can denote an interface via which a connection can be set up between the terminal-external antenna, for example the vehicle antenna, and the signal coupling apparatus. This interface can also allow a bidirectional connection.

Preferably, the terminal-external antenna is DC-connected to the antenna-end interface of the signal coupling device. The terminal-external antenna may also be part of the signal coupling device. The terminal-end interface can be used particularly for inductive connection to the terminal. For this, the terminal-end interface can comprise a further antenna.

It is possible for the signal arm section to denote a section of a signal path or arm via which the connection for signaling purposes is set up or can be set up between the terminal-end interface and the antenna-end interface. As explained in even more detail below, it is possible for different signal paths to be set up between the terminal-end interface and the antenna-end interface by the signal coupling device, a signal path being used for connection for signaling purposes. The signal arm section may in this case be particularly a section that is part of any connection that can be set up between the terminal-end interface and the antenna-end interface. In particular, the signal arm section may be a section of a transmission signal arm or transmission signal path that is part of a connection for signaling purposes between the terminal-end interface and the antenna-end interface if a signal sent by the terminal is intended to be transmitted to the terminal-external antenna.

Preferably, the signal arm section is not part of the connection that can be set up between the terminal-end interface and the antenna-end interface, however.

A reception signal arm for transmitting a signal received by the terminal-external antenna to the terminal may in this case be in a different form than the transmission signal arm. In particular, the signal arm section may also not be part of such a reception signal arm.

Further, at least one signal property of a signal present or the at least one signal arm section is determined. A signal property may be particularly a level on an intensity of the signal that is present. The determination of a signal property in this case naturally comprises the determination of a time profile of the signal property, for example a time profile of the signal level. A signal may be present on the signal arm section, for example, if the signal is transmitted via the signal arm section. The signal arm section can therefore also be referred to as a detection signal arm section.

Further, the at least one signal property is taken as a basis for determining a signal type, wherein the determined signal type is a time division duplex signal or a frequency division duplex signal.

Properties of the time division duplex signal and frequency division duplex signal have already been described by way of introduction. A time profile of a time division duplex signal can in this case have transmission time slots and reception time slots, wherein a signal level, particularly an average signal level, may be higher in transmission time slots than in reception time slots. A time division duplex signal may in this case be divided into signal periods, wherein a period may be divided into a predetermined number of time slots, with a predetermined sub-number of these time slots being able to be provided as transmission time slots and the remaining number being able to be provided as reception time slots. By way of example, a signal period can have eight time slots, with one or two or more, particularly up to eight, time slots, for example the first or the first two time slot(s), being provided as transmission time slot(s) and the remaining time slots being provided as reception time slots.

A frequency division duplex signal has no such modification of a signal level, particularly that is to say a substantially constant signal level. As such, the frequency division duplex signal may be what is known as a CW signal (continuous wave signal).

Hence, it is thus possible for the signal type to be determined preferably on the basis of a time profile of the signal level. To this end, suitable threshold value methods, for example, can be used for detecting determined signal levels. If the determined signal type is a time division duplex signal, then it is further possible to determine a transmission mode, particularly a simplex transmission mode or a semi-duplex transmission mode.

Further, signal-type-specific control of a mode of at least one signal processing device of the signal coupling device is affected. The signal-type-specific control can, however, be effected particularly only when a time division duplex signal has been determined or detected. The signal-type-specific control can be affected on the basis of the signal type.

A signal processing device in this case denotes a device that can modify and/or influence at least one signal property of a transmitted signal. The signal processing device may in this case be an active or passive signal processing device. In particular, the signal processing device may be in the form of an electronic component.

Preferably, the signal-type-specific control of a mode of the at least one signal processing device can comprise or be activation and deactivation of the at least one signal processing device. In this case, the modification and/or influencing, performable by means of an activated signal processing device, of the at least one signal property can differ from the modification and/or influencing performable by means of a deactivated signal processing device. In particular, modification and/or influencing can be effected only with an activated signal processing device.

Further, temporal control of the mode can be effected on the basis of a time profile of the at least one signal property, in particular time-profile-dependent activation and deactivation of the at least one signal processing device. As a result, it is advantageously possible to make use of the circumstance that desired signal processing, particularly amplification, of the signal that is present, that is to say of the transmission signal, is necessary only in transmission time slots of a time division duplex signal, whereas no modification or different modification is desired in reception time slots.

It goes without saying that the control of the mode of the at least one signal processing device can also comprise the control or setting of a modification of at least one signal property. By way of example, the signal-type-specific control of a mode can also comprise the control or setting of a gain factor.

According to the invention, a future signal profile of the signal that is present is estimated. This future signal profile can therefore also be referred to as an estimated signal profile. The estimation can in this case also be referred to as a determination or prediction of the future signal profile. Further, the signal-type-specific control of the at least one signal processing device is effected on the basis of the estimated time profile. In particular, the estimated time profile can be taken as a basis for determining time periods, particularly time slots, in which a signal is sent by the terminal. Further, the signal processing device can be controlled such that during these time periods, desired signal processing is effected by the at least one signal processing device. In particular, as explained in even more detail below, the at least one signal processing device can be activated at a time before the beginning of a transmission time period and deactivated at a time after the transmission time period.

The activation or deactivation of the signal processing device can correspond to a switching process, e.g. switching on or switching off. Such a switching process can produce what is known as a switching spectrum. This can result in signal components in undesirable frequency ranges being added to a transmitted signal, particularly to a transmission signal. The proposed signal-type-specific control on the basis of the estimated time profile advantageously allows the reduction of these undesirable signal components, since then, at the time of the switching process, a signal is still not transmitted or no further signal is transmitted whose property is modified and/or influenced by the signal processing device.

This results firstly in an energy saving for operation of the signal coupling device, since the signal processing device is not in a continuously activated condition. Further, however, there is the advantageous result that no undesirable signal corruption is effected as a result of excessively late activation or excessively early deactivation of the at least one signal processing device.

In a further embodiment, the signal type is taken as a basis for setting up a signal-type-specific connection between the terminal-end interface and the antenna-end interface. By way of example, the terminal-end interface can be connected to a sub-arm from a group of at least two sub-arms, the terminal-end interface being connectable to the antenna-end interface via each of the sub-arms from the group of at least two sub-arms. Hence, it is thus possible for multiple possible signal paths to be able to be set up from the terminal-end interface to the antenna-end interface, e.g. one of the sub-arms, the signal path to be set up being chosen in a signal-type-specific manner. By way of example, if the determined signal is a frequency division duplex signal, the connection between the terminal-end interface and the antenna-end interface can comprise or have a duplexing filter element. The duplexing filter element is used to allow the split into transmission signals and received signals and the parallel processing thereof.

Further, if the determined signal type is a time division duplex signal and possibly additionally a predetermined transmission mode of the time division duplex signal, then the connection between the terminal-end interface and the antenna-end interface may be a connection that is free of a duplexing filter element. In this case, the connection thus comprises no duplexing filter element. This may be the case particularly with time division duplex signals that are transmitted in simplex mode. In the case of signals that are transmitted using the semi-duplex method, however, the duplexing filter elements may be present in the connection. It goes without saying that a connection without a duplexing filter element can contain further elements of the signal coupling apparatus, however, e.g. an amplifier device. This is explained in more detail below. The setup of a signal-type-specific connection can in this case be effected particularly by means of a sub-arm switching unit and/or an antenna switching unit, with a switching unit being able to connect an input signal arm, particularly multiple input signal arms, of the switching unit to an output signal arm, particularly multiple output signal arms, of the switching unit.

Therefore, an advantageous result is that for a time division duplex signal that is present, particularly for a time division duplex signal that is transmitted in simplex transmission mode, which can also be referred to as single frequency simplex transmission mode, or in dual frequency simplex transmission mode, no additional attenuation by an unnecessary duplexing filter element is inserted into the signal path between the terminal-end interface and the antenna-end interface. Further, an advantageous result on account of the fact that it is now possible for time division duplex signals and frequency division duplex signals to be transmitted via different signal (sub)paths is that a duplexing filter element is no longer used to transmit a time division duplex signal, particularly a time division duplex signal that is transmitted in simplex transmission mode. It is therefore possible to use duplexing filter elements with lower load capacity. This reduces firstly costs and secondly an installation space requirement for the signal coupling device.

In a further embodiment, the signal processing device is an amplifier device. The amplifier device can in this case amplify a transmission signal, particularly by a predetermined extent. The amplifier device may be part of any of the sub-arms explained above for connecting the terminal-end interface to the antenna-end interface, i.e. can amplify any transmitted signal. Alternatively, there may also be a respective amplifier device arranged in each of the sub-arms explained above.

This advantageously results in a particularly energy-saving mode of the signal coupling device, since an amplifier device requires additional energy for amplifying the transmission signal. As a result of deactivation during one or more reception time periods, particularly during reception time slots, the energy required is reduced.

In a further embodiment, a standard of a communication or signal transmission being effected using the signal that is present is determined, wherein the future signal profile is additionally determined on the basis of previously known properties of the standard.

The standard can be determined on the basis of a signal path, for example. This is explained in more detail below. It goes without saying, however, that it is also possible for the standard to be determined on the basis of frequency, with a frequency of the signal that is present being determined and the frequency being taken as a basis for determining the relevant standard.

A multiplicity of possible standards of the communication or signal transmission is conceivable. By way of example, a standard may be a GSM850 standard, a GSM900 standard, a GSM1800 standard, a GSM1900 standard, a UMTS standard or an LTE standard.

Particularly if the standard provides a signal transmission with a time division duplex signal, it is advantageously possible to better estimate a future signal profile. By way of example, a previously known, standard-specific split for the signal period into transmission time slots and reception time slots may be previously known or can be learned and hence may be determinable. It is therefore possible for the estimation to be advantageously improved in light of the previously known split. This in turn allows improved compliance for the desired signal transmission quality.

In a further embodiment, a starting time of at least one future transmission time period and/or an ending time of the at least one future transmission time period is determined. A transmission time period can in this case comprise one or more successive transmission time slot(s), particularly a signal period. Further, the mode of the at least one signal processing device is controlled on the basis of the starting time and/or the ending time. In particular, the at least one signal processing device can be activated at a time before, particularly by a predetermined period before, the starting time and deactivated at a time after, particularly by a predetermined period at a time after, the ending time. The predetermined period before the starting time can in this case be chosen on the basis of operating properties of the at least one signal processing device. The predetermined period can be chosen particularly such that at the starting time, the desired signal processing, for example the desired amplification, is ensured.

In a further embodiment, a discrepancy in the estimated signal profile from an actually arising signal profile is determined, wherein a fresh estimation of the future signal profile is performed if a discrepancy is greater than a predetermined extent.

This can advantageously ensure that a desired prediction quality is produced.

By way of example, a time profile of a difference between the estimated signal profile and the actual signal profile can be determined, with an undesirable discrepancy being present if the difference or an absolute value of the difference is greater than a predetermined threshold value.

In a further embodiment, a switching unit is connected to the terminal-end interface via a first group of at least two input signal arms, wherein the at least one signal arm section forms an output signal arm of the switching unit or is connected to the output signal arm. Further, the switching unit connects a selected input signal arm from the first group of at least two input signal arms to the output signal arm. It is naturally also conceivable for there to be more than one output signal arm, a selected input signal arm being connected to a selected output signal arm from a set of output signal arms.

The terminal-end interface may therefore be connectable both to the switching unit and to the terminal-external antenna, particularly via mutually independent or different signal paths. As such, the terminal-end interface may be connected to a signal branching device, for example, with a first output of the signal branching device being connected or connectable to the switching unit and a further output of the signal branching device being connectable to the terminal-external antenna.

The output signal arm can also be understood to mean an output connection or an output interface of the switching unit. The switching unit can be used to connect each of the input signal arms of the first group of input signal arms to the output signal arm of the switching unit, only one input signal arm of the first group of input signal arms being connectable to the output signal arm of the switching unit at one time. The input signal arms of the first group of input signal arms can be used for transmitting a transmission signal from the terminal to the switching unit.

Preferably, the individual input signal arms of the first group of input signal arms are used for transmitting signals with different frequency ranges (frequency bands), particularly for transmitting signal components of the transmission signal with different frequency ranges. Therefore, the individual input signal arms can differ from one another at least insofar as they are designed for transmitting signals in different frequency ranges.

The circuit arrangement can comprise e.g. five input signal arms of the first group of input signal arms. By way of example, different input signal arms can be used to transmit signals according to the GSM850 standard, the GSM900 standard, the GSM1800 standard, the GSM1900 standard, the UMTS standard or a further standard. It is also possible for e.g. signals according to an LTE standard to be transmitted. Further, time division duplex signals or frequency division duplex signals can be transmitted. The invention is not limited to the cited standards and methods in this case, however, and therefore relates to all standards and methods already known to a person skilled in the art and also future standards and methods.

It is possible e.g. for at least one filter element to be arranged between the switching unit and the terminal-end interface explained above, the at least one filter element being able to be used to split the signal received at the interface, particularly the transmission signal from the terminal, into different frequency ranges, these components then being transmitted to the switching unit via the different input signal arms of the first group of input signal arms. The filter element may therefore be a band-specific filter element. It is also possible for each input signal arm to have a band-specific filter element arranged in it, with only signals at frequencies from a predetermined frequency range therefore being transmitted to an input connection of the switching unit.

The different input signal arms of the first group of input signal arms can in this case each form part of a signal path from the terminal-end interface to the antenna-end interface, the signal path in this case thus comprising an input signal arm and the proposed signal arm section. Preferably, the different input signal arms of the first group of input signal arms are, however, not part of the signal path from the terminal-end interface to the antenna-end interface.

Further, it is possible, as explained in even more detail below, for an activated input signal arm of the first group of input signal arms to be connectable to the output signal arm of the switching unit by the switching unit. Within the context of this invention, an activated input signal arm of the first group of input signal arms denotes an input signal arm to which a signal, particularly a transmission signal, is applied. Accordingly, a deactivated input signal arm of the first group of input signal arms denotes an input signal arm to which a signal is not applied. As explained in more detail below, an activation state of the input signal arms of the first group of input signal arms can be determined, with the detected activated input signal arm then being connected to the output signal arm of the switching unit. The determination of the activation state can in this case denote the checking of the input signal arms of the first group of input signal arms for activation or deactivation.

Since the input signal arms of the first group of input signal arms, as explained above, are frequency-(range-) specific input signal arms, the activation state can also be taken as the basis for determining the frequency range in which signals are sent and/or received by the terminal. This in turn allows the determination, explained above, of the standard of the communication. Therefore, it is thus possible to take an activation state of input signal arms as a basis for determining a standard of a communication being effected using the signal that is present, wherein the future signal profile is additionally determined on the basis of previously known properties of the standard.

It is possible for the signal coupling device to comprise only one switching unit. In this case, the input signal arms of the first group of input signal arms can be checked for their activation state continually, e.g. periodically, or at predetermined times. The determination of the activation state of the input signal arms of the first group of input signal arms can begin (again), for example, if no further applied signal is detectable, particularly for a predetermined period, on an input signal arm currently connected to the output signal arm.

The output signal arm of the switching unit can be used, by way of example, for connection of the switching unit to an evaluation device that will be explained in even more detail below. In this case, it is possible for the connection of the first switching unit to the evaluation device to comprise further elements, for example a detector device. This is likewise explained in more detail below. By way of example, the signal coupling device can comprise a first evaluation device, the first evaluation device being able to be used to detect the activated input signal arm. The first evaluation device may be a level measuring device, for example, or can comprise such a level measuring device. The first evaluation device may be connected to the switching unit via the output signal arm of the switching unit. Further, the circuit arrangement can comprise a control device that controls the switching unit, particularly at least one switching element of the switching unit, such that a selected input signal arm is connected to the output signal arm of the switching unit. As explained in even more detail below, the signal coupling device can also comprise more than one, particularly two, switching units, however. An evaluation device may be embodied as a microcontroller, for example.

In a further embodiment, a first switching unit is connected to the terminal-end interface via at least two input signal arms of the first group of input signal arms, wherein the first switching unit connects a selected input signal arm of the first group of input signal arms to an output signal arm of the first switching unit. Further, a further switching unit is connected to the terminal-end interface via at least two input signal arms of a further group of input signal arms, wherein a selected input signal arm from the further group of input signal arms is connected to an output signal arm of the further switching unit, the at least one signal arm section forming the output signal arm of the further switching unit or being connected to the output signal arm of the further switching unit.

The selected input signal arms of the two switching units can in this case be selected independently of one another. This means that the output signal arms of the switching units can each be connected to corresponding input signal arms or else to noncorresponding input signal arms.

The input signal arms of the first group and of the further group may in this case be in joint form at least in sections. However, it is also possible for the input signal arms of the first and of the further group to be in a completely different form from one another. In this case, the signal coupling device comprises two switching units, the first switching unit being able to be referred to as a detection unit and the further switching unit being able to be referred to as a monitoring unit. This is explained in more detail below.

An output signal arm of the further switching unit may in this case be part of the connection for signaling purposes that is to be set up according to the invention by means of the signal coupling device, particularly part of the connection between the terminal and the external antenna. Preferably, however, neither the input signal arms of the further group nor the output signal arm of the further switching unit are part of the signal path from the terminal-end interface to the antenna-end interface. The output signal arm can also be understood to be an output connection or an output interface of the further switching unit.

By means of the further switching unit, each of the input signal arms of the further group of input signal arms is connectable to the output signal arm of the further switching unit, with only one input signal arm being connectable to the output signal arm of the further switching unit at one time.

The switching units can each have, by way of example, n input connections and precisely one output connection each, with corresponding input connections of the switching units each being connected to one of the input signal arms of the relevant group. In this case, n>1. Corresponding input connections of the switching units in this case denote input connections that are each connected to an input signal arm via which the same signal is transmitted. In particular, corresponding input connections may be connected to the same input signal arm.

It is conceivable for an input signal arm to have a common subsection, a branch point, a first subsection and a further subsection, wherein the common subsection branches into the first and further subsections at the branch point, the first subsection being connected to one of the input connections of the first switching unit and the further subsection being connected to a corresponding input connection of the further switching unit. The common subsection can in this case denote a common section of an input signal arm of the first and of the further group of input signal arms. In this case, the first subsection denotes a section of an input signal arm of the first group, while the further subsection denotes a section of an input signal arm of the further group.

The output signal arm of the further switching unit may be connectable to the sub-arm switching unit explained above or an amplifier device. Preferably, however, the output signal arm of the further switching unit is connected to the evaluation device explained above or a further evaluation device.

The proposed circuit arrangement advantageously allows an activated input signal arm to be permanently connectable to the output signal arm of the further switching unit by the further switching unit, the first switching unit being able to be used to connect the input signal arms alternately to the output signal arm of the first switching unit, and the output signal arm then being able to be checked for presence of a signal.

If, as explained in even more detail below, the first switching unit is used to check the currently unactivated or all input signal arms continually, at particular times or on detection of particular signal states on the currently monitored signal arm, particularly on detection of deactivation, for activation/deactivation, then a sudden change of the activation of the input signal arms can be detected more quickly, since, in particular, it is not absolutely necessary for deactivation to be detected first of all and only then for a fresh search to be started. This advantageously decreases a signal loss on the change of activation states of the input signal arms. Further, a hitherto activated signal arm can continue to remain connected to an evaluation device by the further switching unit, this advantageously allowing more reliable monitoring of the signals on this hitherto activated signal arm. Particularly in the case of a signal pause in which no signal has been transmitted via the hitherto activated signal arm, but the signal arm has not been deactivated, the signal can, after the end of the signal pause, be transmitted e.g. to the evaluation device again without loss of time.

An output signal arm of the further switching unit can be used, by way of example, for connecting the further switching unit to the evaluation device explained above or a further evaluation device. The connection of the further switching unit to the evaluation device or a further evaluation device can also comprise further elements, for example the detector device explained above or a further detector device. In this case, the output signal arm can also be understood to be an output connection or an output interface of the further switching unit.

It is possible e.g. for the circuit arrangement to comprise a further evaluation device, the further evaluation device being able to be used to monitor an activated input signal arm. The further evaluation device may, by way of example, likewise be a level measuring device or can comprise such a level measuring device. The further evaluation device may be connected to the further switching unit via the output signal arm of the further switching unit. In this case, the output signal arm of the further switching unit may also be connected to further elements besides the further evaluation device. As such, it is possible for a signal branching element to be provided in the output signal arm of the further switching unit, wherein an input connection of the signal branching element is connected to the output connection of the further switching unit, wherein a first output connection of the signal branching element is used for setting up the connection for signaling purposes which is to be set up by means of the coupling device and is connected e.g. to a sub-arm switching unit or an amplification device, with a further output connection of the signal branching element being connected to the further evaluation device.

The further evaluation device can be used to monitor whether an input signal arm, particularly a hitherto activated input signal arm that is connected to the output signal arm of the further switching unit by means of the further switching unit, is (still) an activated input signal arm. This can also be referred to as monitoring an activation state of the input signal arm.

If e.g. the further evaluation device is used to detect that this input signal arm is no longer activated, that is to say is deactivated, e.g. if a level is lower than a predetermined threshold value, then fresh detection of an activated input signal arm can be initiated by means of the first switching unit and the first evaluation device. Deactivation can be detected e.g. if a level is lower than a predetermined threshold value, particularly for a predetermined period.

To initiate a fresh detection, the further evaluation device can e.g. produce an appropriate initiation signal and transmit it to the control device of the first switching unit, which control device is explained above. During this fresh detection by means of the first switching unit and the first evaluation device, which can also be referred to as a search, it is possible for a connection state of the further switching unit to be preserved. This means that the hitherto activated input signal arm that was connected to the output signal arm of the further switching unit by means of the further switching unit still remains connected to the output signal arm, particularly until an activated input signal arm different than this input signal arm is detected. Since the detection of deactivation described above can involve a search being initiated even when there is only a signal pause for the signal present on the hitherto activated signal arm, and no actual deactivation, preserving the connection state advantageously results in the signal being able to be monitored again immediately after the signal pause has elapsed, since the still activated signal arm continues to be connected to the further evaluation device via the further switching unit. If the first evaluation device is used to detect an activated input signal arm different than the hitherto activated input signal arm, then the further switching unit can be actuated such that the output signal arm of the further switching unit is connected to this currently activated input signal arm.

The further evaluation device may in this case be the same as the first evaluation device. In this case, the first evaluation device may be connected to the further switching unit via the output signal arm of the further switching unit. In particular, the first and the further evaluation device can be provided by a common evaluation device, particularly by a microcontroller. Therefore, the first and the further evaluation device may be in the form of physically separate devices or can be provided by a common evaluation device.

Therefore, the further switching unit can also be referred to as a monitoring unit. The connection of the activated input signal arm to the output signal arm can be maintained particularly until a new activated input signal arm is determined and an appropriate control signal is produced.

Therefore, the first and/or the further switching unit may be controllable on the basis of activation states of the input signal arms.

In a further embodiment, an activated input signal arm is determined, wherein the activated input signal arm is connected to the output signal arm of a switching unit. By way of example, the signal coupling device can comprise an evaluation device, wherein the evaluation device can be used to detect the activated input signal arm. The evaluation device may be a level measuring device, for example. Further, the signal coupling device can comprise a control device that takes the detected activated input signal arm as the basis for controlling the switching unit such that the activated input signal arm is connected to the output signal arm of the switching unit.

By way of example, the activated input signal arm can be determined on the basis of at least one signal property of a signal present on the output signal arm of the switching unit. Further, the first switching unit can be used to render the input signal arms connectable to the output signal arm of the first switching unit at predetermined switching times, particularly after a fresh detection of an activated switching arm has been initiated or after deactivation of the hitherto activated input signal arm has been detected. The first switching unit can therefore also be referred to as a detection unit or scan unit. In this regard, the first switching unit, particularly the switching element(s) of the first switching unit, can be controlled as appropriate, for example by a control device, which may be part of the proposed circuit arrangement. Further, the switching times may be stipulated in a predetermined switching pattern. Preferably, the first switching unit can be used to connect the input signal arms to the output signal arm of the first switching unit at a predetermined switching frequency. The switching frequency may be in the region of 25 kHz (40 µs), for example. However, the switching frequency is adjustable depending on the application. Therefore, the first switching unit is controllable on the basis of a predetermined switching pattern.

Therefore, an advantageous result is that the input signal arms can be checked for their respective activation state regularly, in particular periodically, or at least after detected deactivation. In this regard, as explained above, the first switching unit may be connected by the output signal arm of the first switching unit to an evaluation device for determining an activated or deactivated state.

The activated input signal arm can be determined on the basis of at least one signal property of a signal present on the output signal arm of the first switching unit. In particular, the activated input signal arm can be determined on the basis of at least one signal property of the signals present on the output signal arm of the first switching unit during a complete switching period, wherein the complete switching period denotes a period in which each input signal arm is connected to the output signal arm of the first switching unit at least once. A signal property can denote, by way of example, a signal level or an intensity or a power of the signal that is present. It goes without saying that further signal properties can also be chosen.

In particular, the determination of the activated input signal arm can be effected on the basis of a comparison between the at least one signal property of all input signal arms. Therefore, the signal properties are compared relative to one another. By way of example, the at least one signal property can be determined and stored for each input signal arm, particularly in the switching period explained above. After the switching period has elapsed, it is then possible for the signal properties determined in this manner for the different input signal arms to be compared. By way of example, an activated input signal arm can be determined as the input signal arm having the highest signal level.

It goes without saying that an activated input signal arm can additionally be determined on the basis of at least one absolute signal property. By way of example, an activated input signal arm can be detected only if the signal level is higher than a predetermined threshold value, e.g. higher than a threshold value that is dependent on noise.

Alternatively or cumulatively, an activated input signal arm, particularly an activation state of this input signal arm, is monitorable on the basis of at least one signal property of the signals present on the output signal arm of the further switching unit. This means that at least one signal property of the signals present on the output signal arm of the further switching unit can be taken as a basis for detecting whether the input signal arm that is currently connected to the output signal arm of the further switching unit is an activated or deactivated input signal arm. In particular, in accordance with the explanations pertaining to the determination of the activated input signal arm, at least one signal property can also be taken as a basis for performing the monitoring, explained above, of the activation state on the basis of at least one signal property of a signal present on the output signal arm of the further switching unit. In particular, the activation state can thus be monitored on the basis of one or more signal property (properties), which have been explained by way of example above, of a signal present on the output signal arm of the further switching unit.

This advantageously results in reliable detection of a freshly activated input signal arm, with monitoring of the hitherto activated signal arm being ensured at the same time.

Further, the circuit arrangement can comprise a first evaluation device, wherein the first evaluation device can be used to determine an activated input signal arm. Alternatively or cumulatively, the circuit arrangement can comprise a further evaluation device, wherein the further evaluation device can be used to monitor an activated input signal arm, particularly an activation state of this input signal arm. The determination or detection of an activated input signal arm by means of the first evaluation device and the monitoring of the activation state by means of the further evaluation device have been explained above in this case. The first evaluation device can in this case also be referred to as a detection device, and the further evaluation device can in this case also be referred to as a monitoring device. The first and the further evaluation device have already been explained above. This advantageously results in isolation of detection and monitoring.

Further, the first and the further switching unit may be arranged on a common printed circuit board. In particular, the first and the further switching unit may be arranged relative to one another in or on a common printed circuit board such that a length of the first subsection, explained above, and/or a length of the further subsection, explained above, of an input signal arm is/are shorter than a predetermined length, particularly shorter than a wavelength-dependent length. In particular, a length of the first subsection and/or of the further subsection may be shorter, preferably very much shorter, than A/4, where A comprises the wavelengths from the wavelength range or denotes the shortest wavelength from this range that the signal to be transmitted via the respective input signal arm has. The length of the common subsection in this case can be chosen arbitrarily. If the length of a subsection is A/4, then an impedance that is connected at the end of the subsection can be transformed. As such, it is e.g. possible for an open circuit at the end of a subsection to be transformed into a short at the branch point. As a result, the input signal can be undesirably isolated for signaling purposes from the switching units.

In the proposed embodiment, it is therefore advantageously possible to prevent a circuitry short in the connection that is to be set up according to the invention, which can arise when the further subsection in an activated input signal arm is connected to the output signal arm of the further switching unit via the further switching unit, but the first subsection is not connected to the output signal arm of the first switching unit, in particular is open or is connected to a reference potential of the first switching unit, particularly a ground potential of the first switching unit. In this case, the first subsection can form what is known as an "open stub". However, particularly if the length is A/4, said open stub can transform the open circuit, as explained above, into a short. Further, the arrangement on a common printed circuit board advantageously results in a compact physical embodiment of the proposed circuit arrangement.

Further, the first switching unit and the further switching unit may be arranged on opposite surfaces of the printed circuit board. By way of example, the first switching unit may be arranged on a top of the printed circuit board and the further switching unit may be arranged on an underside of the printed circuit board, or vice-versa. In this case, the input signal arms and/or the output signal arms can each run on a surface of the printed circuit board or inside the printed circuit board. This advantageously results in an even more compact physical design of the circuit arrangement. Preferably, the switching units may be arranged in a mirror-image fashion relative to the printed circuit board, particularly to a plane of symmetry of the printed circuit board. The plane of symmetry may in this case be oriented parallel to the printed circuit board surfaces explained above. In particular, the output signal arms and/or switching elements, explained above, of the switching units, in particular corresponding switching elements, may also be arranged in mirror-image fashion in this case. In this context, in mirror-image fashion can mean that the switching units, particularly also switching elements of the switching units, are arranged at the same position and/or with the same orientation in a common projection plane, which may be oriented parallel to one of the printed circuit board surfaces. As such, it is possible e.g. for a switching element of the first switching unit to be arranged in a direction perpendicular to the surface of the printed circuit board exactly above a, in particular corresponding, switching element of the further switching unit. This advantageously results in a more compact physical form, particularly on account of the short connecting paths for signaling purposes that are made possible thereby.

Further, an input connection of a switching unit, that is to say of the first or of the further switching unit, may be connectable to an output connection of the switching unit via a PIN diode switching element. In this context, a PIN diode switching element denotes a DC-controlled high-frequency impedance element. In particular, the PIN diode switching element provides a DC-controlled on/off switching element. In this case, an adjustable DC flow via the PIN diode switching element can be used to set a high-frequency impedance of the PIN diode switching element. This advantageously results in a switching function (on/off switching function) that is simple to provide. In addition, this can prevent use of switching elements that connect deactivated input signal arms to a ground potential. In addition, PIN diode switching elements are an inexpensive solution.

In a further embodiment, the terminal-end interface is connected to a selected sub-arm from a group of at least two sub-arms, wherein the terminal-end interface is connectable to an antenna-end interface via each of the sub-arms from the group of at least two sub-arms. The selected sub-arm can connect the terminal-end interface to the antenna-end interface. By way of example, a sub-arm switching unit may be connected to the terminal-end interface. The sub-arm switching unit may in this case be designed in accordance with one or more of the aspects described in this regard in this disclosure.

The sub-arm switching unit can be used to connect an input connection, connected to the terminal-end interface, of the sub-arm switching unit to a selected output connection from a group of output connections, each output connection being connected to a sub-arm. The sub-arm switching unit may be connected to input connections of an antenna switching unit via the sub-arms, an output connection of the antenna switching unit being connected to the antenna-end interface. The antenna switching unit can connect a selected input connection of the group of at least two input connections to the output connection of the antenna switching unit. The connection of the terminal-end interface, the sub-arm switching unit and the antenna-end interface may naturally comprise further elements, e.g. coupler devices, filter devices and amplifier devices.

Different sub-arms can be used for transmitting signals, particularly transmission signals, in accordance with different standards, for example in accordance with a GSM standard, UMTS standard or an LTE standard. These standards have been explained above. Further, time division duplex signals or frequency division duplex signals can be transmitted. Therefore, it is also possible for the sub-arms to be used for transmitting signals, particularly transmission signals, with different frequency ranges (frequency bands). Therefore, the individual sub-arms can differ from one another at least insofar as they are designed for transmitting signals in different frequency ranges. It is possible e.g. for the terminal-end interface and the sub-arm switching unit to have at least one filter element arranged between them, wherein the at least one filter element can be used to split the signal received at the interface, particularly the transmission signal from the terminal, into different frequency ranges, these components then being transmitted via the different sub-arms. The filter element may therefore be a band-specific filter element. It is also possible for each sub-arm to have a band-specific filter element arranged in it.

Further, the at least one signal arm section, particularly the detection signal arm section explained above, is connected to the selected sub-arm. In other words, the detection signal arm section is connected to the sub-arm via which the terminal-end interface is connected to the antenna-end interface at the present time. If this sub-arm has a signal, particularly a transmission signal, present on it, then at least part of the signal is also present on the detection signal arm section. In particular, the detection signal arm section can be coupled for signaling purposes to the selected sub-arm. In this case, coupling for signaling purposes can signify that there is no DC connection between the signal arm section and the sub-arm. However, the coupling can decouple part of the signal from the relevant sub-arm and transmit it to the signal arm section.

Further, an activation state of the sub-arms can be determined, with the detected activated sub-arm then being connected to the detection signal arm section. In this case, the activated sub-arm is the selected sub-arm. An activated sub-arm denotes a sub-arm to which a signal, particularly a transmission signal, is applied. Accordingly, a deactivated sub-arm denotes a sub-arm to which a signal is not applied. This has already been explained above with reference to the input signal arms. Since the sub-arms, as explained above, are frequency-(range-)specific sub-arms, the activation state can also be taken as a basis for determining the frequency range in which signals are sent and/or received by the terminal. This in turn allows the determination, explained above, of the standard of the communication.

The detection signal arm section connected to the sub-arm may be connected to a, particularly to the already explained, evaluation device, for example via a detector device, for example the detector device explained above. The evaluation device can be used to render the activated sub-arm detectable. Further, the circuit arrangement can comprise a control device that controls the sub-arm switching unit, particularly at least one switching element of the switching unit, such that a selected, in particular activated, sub-arm is connected to the detection signal arm section. The evaluation device and/or the control device and/or the detector device may in this case be designed in accordance with one or more of the aspects described in this regard in this disclosure.

For the purpose of detecting an activated sub-arm, the terminal-end interface can be connected to the antenna-end interface via respective different sub-arms in successive time periods, e.g. periodically. This can be effected particularly when no activated sub-arm is detected at a present time. In this case, a detection can be initiated. This can involve each sub-arm being successively connected to the detection signal arm section for signaling purposes. Further, it is possible to detect whether the sub-arm currently connected or coupled to the detection signal arm section is an activated sub-arm. The detection of an activated sub-arm can begin (again), for example, if no further applied signal is detectable, particularly for a predetermined period, on a sub-arm currently connected to the detection signal arm section. If an activated sub-arm is detected, then the detection of the activated sub-arm can be terminated and the activated sub-arm can be connected to the detection signal arm section. It goes without saying that other embodiments of the detection, initiation and termination of the detection are also conceivable.

In a further embodiment, a device for detecting a transmission signal is used to detect a transmission signal transmitted by the terminal-end interface, particularly to an antenna-end interface. In particular, the device for detecting a transmission signal can be used to detect a signal transmitted from the terminal-end interface to the sub-arm switching unit. This detection may be different than the detection of an activated sub-arm.

By way of example, an evaluation device, particularly the evaluation device explained above, can be connected, preferably coupled, to a signal arm section between the terminal-end interface and the sub-arm switching unit. This connection can be made via a further detector device. It is also possible for the connection to be made via filter elements that can be used to filter frequency ranges that are used for transmitting signal components of the transmission signal in accordance with the standard to be transmitted. The evaluation device and/or the detector device may in this case be designed in accordance with one or more of the aspects described in this regard in this disclosure. The evaluation device can then be used to detect whether a signal is transmitted in accordance with one of these standards. This can be detected, by way of example, when a signal level in at least one of the frequency ranges is higher than a predetermined threshold value. When such a (transmission) signal is detected, the detection, explained above, of the activated sub-arm can be initiated or performed. When no (further) such (transmission) signal is detected, the detection, explained above, of the activated sub-arm can be terminated.

The proposal further relates to a signal coupling device, wherein the signal coupling device comprises at least one signal arm section that is connected or can be connected to a terminal-end interface for signaling purposes.

Further, the signal coupling device further comprises at least one evaluation device, which can also be referred to as a control and evaluation device. The evaluation device can be used to determine at least one signal property of a signal present on the at least one signal arm section. Further, the at least one signal property can be taken as a basis for determining a signal type, the determinable signal type being a time division duplex signal or a frequency division duplex signal. Further, a signal-type-specific connection may be able to be set up between the terminal-end interface and an antenna-end interface, e.g. by means of the control and evaluation device. Further, the signal type can be taken as a basis for setting a signal-type-specific mode of at least one signal processing device of the signal coupling device, e.g. by means of the control and evaluation device. A control and evaluation device may be in the form of a microcontroller.

The signal coupling device can comprise, by way of example, an antenna switching unit via which a sub-arm from a group of multiple sub-arms is connectable to the terminal-external antenna. It goes without saying that the signal coupling device can comprise yet a further or multiple further switching units that can be used to set up a desired signal path between the terminal-end interface and the antenna-end interface. By way of example, it is thus possible to take the signal type as the basis for controlling the antenna switching unit and/or at least one further switching unit, for example of a sub-arm switching unit, such that a desired signal-type-specific connection is set up between the terminal-end interface and the antenna-end interface.

Further, it is possible, particularly if the determined signal type is a time division duplex signal, to use the evaluation device to effect desired control, particularly activation and deactivation, of the at least one signal processing device.

According to the invention, a future signal profile of the signal that is present is estimatable, the signal-type-specific control of the at least one signal processing device being effected on the basis of the estimated time profile. The signal processing device may in this case likewise be part of the signal coupling device.

The proposed signal coupling device can in this case advantageously be used to perform a method according to one of the embodiments explained above. In particular, the signal coupling device may thus be designed such that a method according to one of the embodiments explained above is performable using the signal coupling device.

DESCRIPTION OF THE INVENTION

In the text below, like reference symbols denote elements having like or similar technical features.

Figure 1:
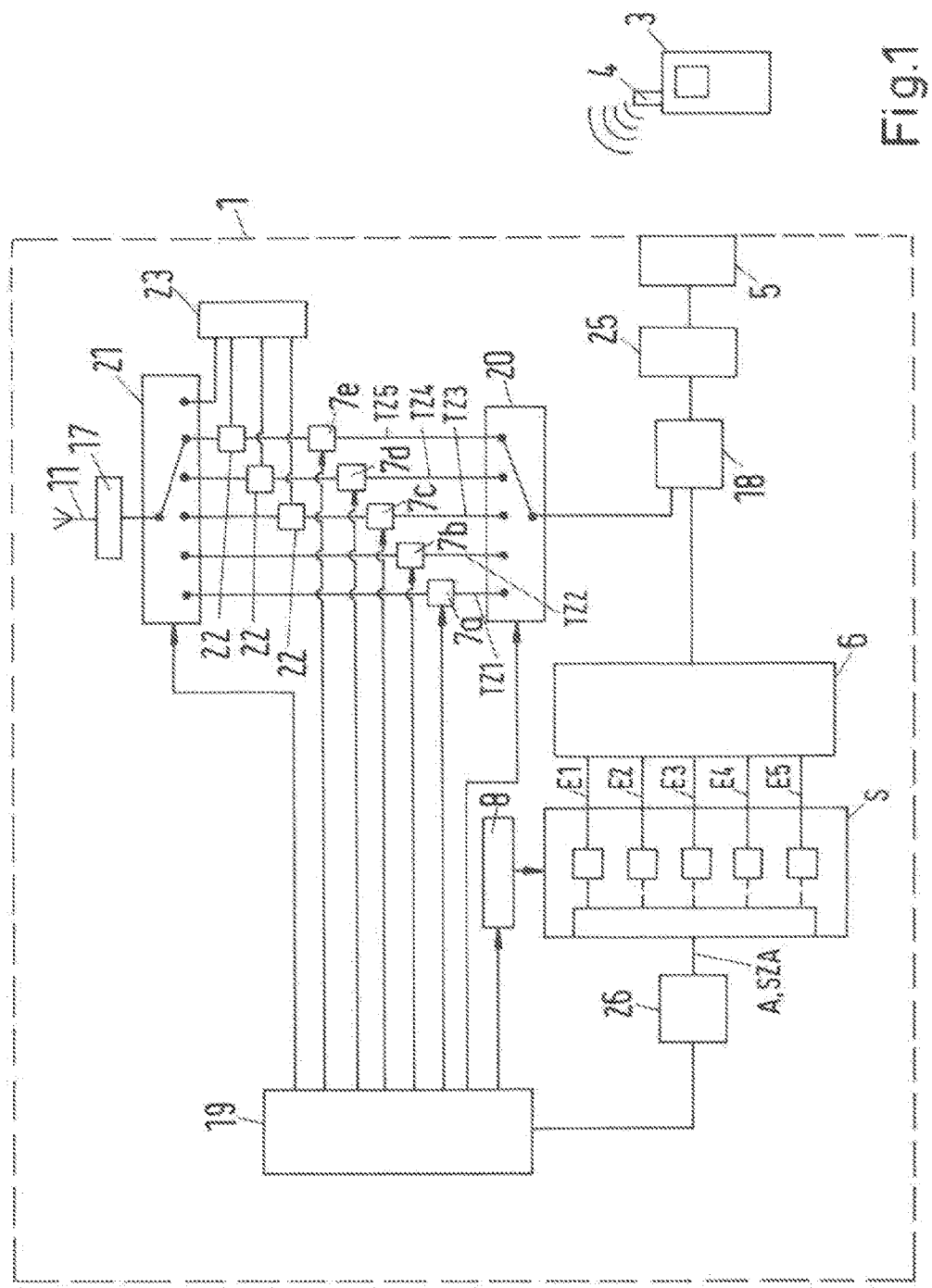
FIG. 1 shows a schematic circuit diagram of a signal coupling apparatus according to the invention.

FIG. 1 depicts a schematic circuit diagram of a signal coupling apparatus 1 according to the invention. The signal coupling apparatus 1 is used for coupling a terminal 3, particularly a mobile radio telephone, to an external antenna 11, for example a vehicle antenna, for signaling purposes. The signal coupling apparatus 1 may be arranged in a vehicle. In this case, however, FIG. 1 depicts the part of the signal coupling device 1 that is used for transmitting transmission signals 4 from the terminal 3 to the antenna 11 in more detail. Depicted only schematically is a reception section 23 of the signal coupling device 1, which is used for transmitting signals that are received by the antenna 11 to the terminal 3.

The signal coupling device 1 comprises a terminal-end signal interface 5 for receiving the transmission signals 4 from the terminal 3. The signal interface 5 may naturally also be designed such that the signal interface 5 can be used to send signals from the signal coupling device 1 to the terminal 3.

The signal interface 5 is connected to a filter device 25. This filter device 25 can comprise, by way of example, one or more duplexing filters that are used for transmitting signals from the terminal-end interface 5 to the antenna 11 and from the antenna 11 to the terminal-end interface 5. The filter device 25 may to this end be connected to the reception section 23 (not depicted).

The filter device 25 is connected to a signal branching element 18, which can also be referred to as a splitter. A first output of the signal branching element 18 is connected to a sub-arm switching unit 20. A further output of the signal branching element 18 is connected to a filter element 6 that filters the received transmission signal 4 from the terminal 3 into components having different frequency ranges.

The signal coupling device 1 further comprises five input signal arms E1, E2, E3, E4, E5, wherein each input signal arm E1, . . . , E5 is used for transmitting a respective component, filtered by the filter element 6, of the received transmission signal 4. It goes without saying that there may also be more or fewer than five input signal arms. Therefore, the input signal arms E1, . . . , E5 are used to transmit signals with different frequency ranges.

Further, the circuit arrangement 1 comprises a switching unit S, wherein the switching unit S has an output signal arm A. In this case, the output signal arm A forms a signal arm section SZA that is connected to the signal interface 5, which forms a terminal-end interface, particularly via the switching unit S, one of the input signal arms E1, . . . , E5, the filter element 6, the signal branching element 18 and the filter device 25.

The switching unit S can be used to connect each of the input signal arms E1, . . . , E5 to the output signal arm A, but only one selected input signal arm E1, . . . , E5 is connectable to the output signal arm A at one time. To connect the input signal arms E1, . . . , E5 to the output signal arm A, the switching unit S has e.g. five switching elements.

As such, e.g. the first switching element of the switching element S can be used to connect a first input signal arm E1 to the output signal arm A of the switching element S. FIG. 1 uses a solid line to depict that the first input signal arm E1 is connected to the output signal arm A by means of the first switching element of the switching unit S.

Further, the depiction shows that the switching unit S is connected to a control and evaluation device 19 via the output signal arm A and a detector device 26. The detector device 26 produces an output signal that is dependent on a signal level of a signal present on the output signal arm A. In particular, the output signal from the detector device 26 may be an analog (voltage) signal whose amplitude is proportional to the signal level.

The depiction further shows a first control device 8 that can control the switching unit S, particularly switching elements of the switching unit S. The control device 8 is connected to the control and evaluation device 19 for signaling purposes. Therefore, it is also possible for the control and evaluation device 19 to control the switching unit S via the control device 8.

The sub-arm switching unit 20 has a predetermined number of output connections, wherein the number of output connections may be the same as the number of input signal arms E1, . . . , E5, but does not have to be. The sub-arm switching unit 20, which is controllable by the control and evaluation device 19, can be used to connect the first output of the signal branching device 18 to a selected output connection of the sub-arm switching unit 20 for signaling purposes. Each output connection has a respective sub-arm TZ1, TZ2, TZ3, TZ4, TZ5 connected to it. A first and a second sub-arm TZ1, TZ2 are used for transmitting time division duplex signals, for example signals in accordance with a GSM standard. A third, a fourth and a fifth sub-arm TZ3, TZ4, TZ5 are used for transmitting frequency division duplex signals, for example signals in accordance with a UMTS standard or an LTE standard.

Each sub-arm TZ1, . . . , TZ5 has an amplifier device 7a, 7b, 7c, 7d, 7e arranged in it. A first amplifier device 7a can be used to amplify the signal present on the first sub-arm TZ1. Accordingly, one of the further amplifier devices 7b, . . . , 7e can be used to amplify the respective signal present on the further sub-arm TZ2, TZ5. The amplifier devices 7a, . . . , 7e are in this case designed such that an amplifier device 7a, . . . , 7e is used to amplify a respective signal component with a particular frequency range, the frequency ranges associated with the individual amplifier devices 7a, . . . , 7e being different than one another. In particular, the frequency ranges that are associated with the respective amplifier devices 7a, . . . , 7e can correspond to the frequency ranges of the signals that are transmitted via the corresponding input signal arm E1, . . . , E5. As such, it is possible e.g. for the frequency range that is associated with the first amplifier device 7a to correspond to the frequency range of the signal that is transmitted via the first input signal arm E1.

The sub-arm switching unit 20 is connected to an antenna switching unit 21 via the sub-arms TZ1, . . . , TZ5. In this case, the antenna switching unit 21 has a respective input connection for each of the sub-arms TZ1, . . . , TZ5. The sub-arm switching unit 20 can, however, also have more connections than the number of sub-arms TZ1, . . . , TZ5. An output connection of the antenna switching unit 21 is connected to the antenna 11 via the antenna-end interface 17 for signaling purposes. The antenna switching unit 21 can connect precisely one of the input connections to the output connection.

In this case, the sub-arms TZ3, . . . , TZ5 that are used for transmitting frequency division duplex signals have respective duplexing filters 22 arranged in them. The duplexing filters 22 and the reception section 23 are used to transmit a signal received by the antenna 11 to the terminal 3. A signal that is intended to be transmitted from the terminal 3 to the antenna 11 via the sub-arm switching unit 20 and the antenna switching unit 21 is therefore transmitted via the respective duplexing filter 22. Further, the antenna switching unit 21 has an output connection to which the reception section 23 is connected.

The amplifier devices 7a, . . . , 7e and the antenna switching unit 21 are controllable by the control and evaluation device 19.

The control and evaluation device 19 evaluates a time profile of a signal level of the signal present on the output signal arm A and determines whether a time division duplex signal or a frequency division duplex signal is available. The signal type is then taken as a basis for controlling the sub-arm switching unit 20 and the antenna switching unit 21. Further, a standard of a communication taking place using the signal present on the output signal arm A can be determined.

Therefore, the control and evaluation device 19 is used to set up a signal-type-specific connection between the terminal-end interface 5 and the antenna-end interface 17. If e.g. a time division duplex signal with a first time division duplex standard, e.g. GSM1800 or GSM1900, is detected, then the sub-arm switching unit 20 can be used to connect the first output of the signal branching device 18 to the first sub-arm TZ1. If e.g. a time division duplex signal with a further time division duplex standard, e.g. GSM850 or GSM900, is detected, then the sub-arm switching unit 20 can be used to connect the first output of the signal branching device 18 to the second sub-arm TZ2.

If e.g. a frequency division duplex signal with a first frequency division duplex standard, e.g. UMTS2100 (UMTS band 1), is detected, then the sub-arm switching unit 20 can be used to connect the first output of the signal branching device 18 to the third sub-arm TZ3. If e.g. a frequency division duplex signal with a second frequency division duplex standard, e.g. LTE800 (LTE band 20), is detected, then the sub-arm switching unit 20 can be used to connect the first output of the signal branching device 18 to the fourth sub-arm TZ4. If e.g. a frequency division duplex signal with a further frequency division duplex standard, e.g. LTE2600 (LTE band 7), is detected, then the sub-arm switching unit 20 can be used to connect the first output of the signal branching device 18 to the fifth sub-arm TZ5. It goes without saying that it is also possible for signals in accordance with the UMTS standard to be transmitted via further bands, e.g. but not exclusively bands 1, 3 or 8. It goes without saying that it is also possible for signals in accordance with the LTE standard to be transmitted via further bands, e.g. but not exclusively bands 3, 7 or 20. In this case, bands denote predetermined frequency ranges that are stipulated for the respective signal transmission standards.

Accordingly, the control and evaluation device 19 can actuate the antenna switching unit 21 such that the relevant sub-arm TZ1, ..., TZ5 is connected to the antenna-end interface 17.

If a time division duplex signal is sent by the terminal 3, then the sub-arm switching unit 20 and the antenna switching unit 21 can be actuated such that during a transmission time slot the relevant sub-arm TZ1, TZ2 via which the time division duplex signal is transmitted is connected to the antenna 11. Further, the antenna switching unit 21 can be actuated such that the reception section 23 is connected to the antenna 11 during a reception time slot.

Further, depending on the signal type and the relevant sub-arm TZ1, ..., TZ5 via which the signal is transmitted, the control and evaluation device 19 can activate and deactivate the amplifier device 7a, ..., 7e associated with the respective sub-arm TZ1, ..., TZ5.

Further, the control and evaluation device 19 can be used to estimate a future signal profile of the signal present on the output signal arm A. This can be effected on the basis of previously known properties of the standard of the communication. The estimation of the future signal profile can be effected particularly if a time division duplex signal is present on the output signal arm A. In particular, a starting time of the transmission time period that follows next in time and an ending time of this transmission time period can be determined.

Further, the control and evaluation device 19 can take the future signal profile as a basis for controlling the relevant amplifier device 7a, 7b. It is possible e.g. for the amplifier device 7a, 7b to be activated at a time before the starting time. At a time after the ending time, the amplifier device 7a, 7b can then be deactivated again. Before a starting time of the transmission time period that comes next in time thereafter, it is then possible for the amplifier device 7a, 7b to be activated again.

Further, the control and evaluation device 19 can take the future signal profile as a basis for controlling the sub-arm switching unit 20 and/or the antenna switching unit 21. By way of example, the antenna switching unit 21 can be controlled at the starting time such that the sub-arm TZ1, TZ2 via which the time division duplex signal is transmitted is connected to the antenna-end interface 17.

When a frequency division duplex signal is present on the output signal arm, the antenna switching unit 21 can be controlled such that the relevant sub-arm TZ3, TZ4, TZ5 is permanently connected to the antenna-end interface 17.

Figure 2:
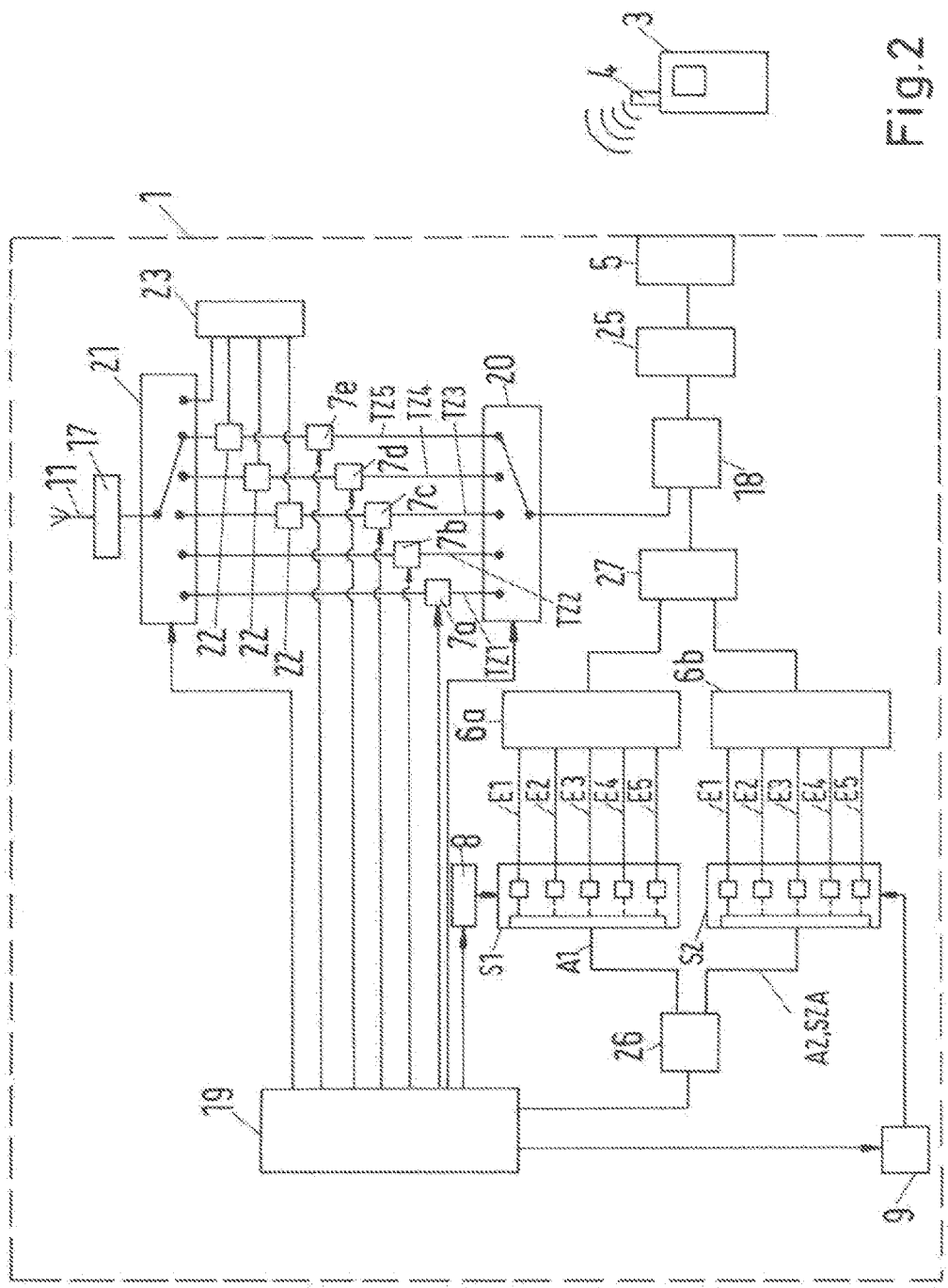
FIG. 2 shows a schematic circuit diagram of a further signal coupling apparatus according to the invention.

FIG. 2 depicts a schematic circuit diagram of a signal coupling device 1 according to the invention in a further embodiment.

In contrast to the signal coupling device 1 depicted in FIG. 1, the signal coupling device 1 comprises a first switching unit S1 and a further switching unit S2. Further, the signal coupling device 1 comprises an output signal arm A1 of the first switching unit S1 and an output switching arm A2 of the further switching unit S2. In this case, the output signal arm A2 of the further switching unit S2 forms a signal arm section SZA of a signal arm on which the signal to be analyzed for at least one signal property is present.

In contrast to the signal coupling device 1 depicted in FIG. 1, the signal coupling device 1 depicted in FIG. 2 comprises a further signal branching device 27, the input of which is connected to the further output of the (first) signal branching device 18. A first output of the further signal branching device 27 is connected to a first filter element 6a. A further output of the further signal branching device 27 is connected to a further filter element 6b. The filter elements 6a, 6b each filter the transmission signal 4 from the terminal 3 into components having different frequency ranges, the frequency ranges of the two filter elements 6a, 6b being the same. The components are then transmitted to the relevant switching unit S1, S2 via input signal arms E1, ..., E5. In this case, corresponding input signal arms E1, ..., E5 of the switching units S1, S2 are used to transmit respective signal components having the same frequency range.

The first switching unit S1 can be used to connect each of the input signal arms E1, ..., E5 to the output signal arm A1 of the first switching unit S1, but only one input signal arm E1, ..., E5 is connectable to the output signal arm A1 at one time. Accordingly, the further switching unit S2 can be used to connect each of the input signal arms E1, ..., E5 to the output signal arm A2 of the further switching unit S2, with only one input signal arm E1, ..., E5 being connectable to the output signal arm A2 of the further switching unit S2 at one time.

To connect the input signal arms E1, ..., E5 to the output signal arm A1, A2, each switching unit S1, S2 has five respective switching elements. As such, it is possible e.g. to use the first switching element of the first switching unit S1 to connect a first input signal arm E1 to the output signal arm A1 of the first switching unit S1. Accordingly, the first input signal arm E1 is connectable by means of a first switching element to the output signal arm A2 of the further switching unit S2.

FIG. 2 uses solid lines to depict that a first input signal arm E1 is connected to the output signal arm A1 of the first switching unit S1 by means of a first switching element of the first switching unit S1. Further, the depiction shows that the first input signal arm E1 is connected to the output signal arm A2 of the further switching unit S2 by means of the first switching element of the further switching unit S2.

The output signal arm A2 of the further switching unit S2 corresponds to the output signal arm A depicted in FIG. 1. In respect of the determination of the signal properties, the signal type and the relevant actuation of the sub-arm switching unit 20, the amplifier devices 7a, ..., 7e and the antenna switching unit 21, reference can therefore be made to the explanations pertaining to FIG. 1. Also with regard to the determination of the standard of a communication taking place using the signal present on the output signal arm A2 of the further switching unit S2 and also an estimation of a future time profile of the signal by the control and evaluation device 19 and the control, based thereon, of the amplifier devices 7a, ..., 7e and also the sub-arm switching unit 20 and the antenna switching unit 21, reference can be made to the explanations pertaining to FIG. 1.

The depiction further shows a first and a further control device 8, 9, which can each control the first and the further switching unit S1, S2, particularly switching elements of the relevant switching unit S1, S2. The control devices 8, 9 are connected to the control and evaluation device 19 for signaling purposes. Therefore, it is also possible for the control and evaluation device 19 to control the switching units S1, S2 via the control devices 8, 9.

In this case, the control of the switching elements of the first switching unit S1 can be effected independently of the control of the switching elements of the further switching unit S2. In particular, the switching elements of the first switching unit S1 can be periodically opened and closed such that the input signal arms E1, . . . , E5 are connected to the output signal arm A1 of the first switching unit S1 periodically, particularly at a predetermined switching frequency, wherein during an entire switching period, each of the input signal arms E1, . . . , E5 is connected to the output signal arm A1 of the first switching unit S1 at least once. This periodic connection can be initiated or begun particularly when the control and evaluation device 19 detects that there is no further signal present on the output signal arm A2 of the further switching unit S2. During this entire switching period, the control and evaluation device 19 can be used to determine the signal properties of the signals present on the output signal arm A1 of the first switching unit S1. These signal properties can be taken as a basis for determining whether an input signal arm E1, . . . , E5 is an activated signal arm, the activated signal arm having a signal applied to it. When the terminal 3 transmits a transmission signal on the frequency band that is transmitted via the first input signal arm E1, for example, the control and evaluation device 19 can be used to detect that a signal having a signal level that may particularly be higher than a predetermined threshold value is present on the first input signal arm E1. The detection of an activated input signal arm E1, . . . , E5 can alternatively or cumulatively also be effected by virtue of the signal levels present on each of the input signal arms E1, . . . , E5 being captured and compared with one another, e.g. during an entire switching period, with that input signal arm E1, . . . , E5 that has the highest signal level being determined as the activated input signal arm E1, . . . , E5.

The control and evaluation device 19 can then transmit information concerning the activated input signal arm E1, . . . , E5 to the further control device 9, wherein the further control device 9 actuates the relevant switching element of the further switching unit S2 such that the output signal arm A2 of the further switching unit S2 is connected to the activated input signal arm E1, . . . , E5. This connection can be maintained until an input signal arm E1, . . . , E5 that is different than the hitherto activated input signal arm E1, . . . , E5 is detected as the activated input signal arm E1, . . . , E5. Therefore, the respective activated input signal arm E1, . . . , E5 is thus connected to the output signal arm A2 of the further switching unit S2 for signaling purposes. When e.g. the terminal 3 changes the frequency range in which the sent signal 4 is sent, this can be detected quickly and reliably by the analysis of the signal present on the output signal arm A1 of the first switching unit S1, as a result of which it is possible for the transmission signal 4 that is now sent in a new frequency range to be switched to the output signal arm A2 of the further switching unit S2 without great loss of time.

Figure 3:
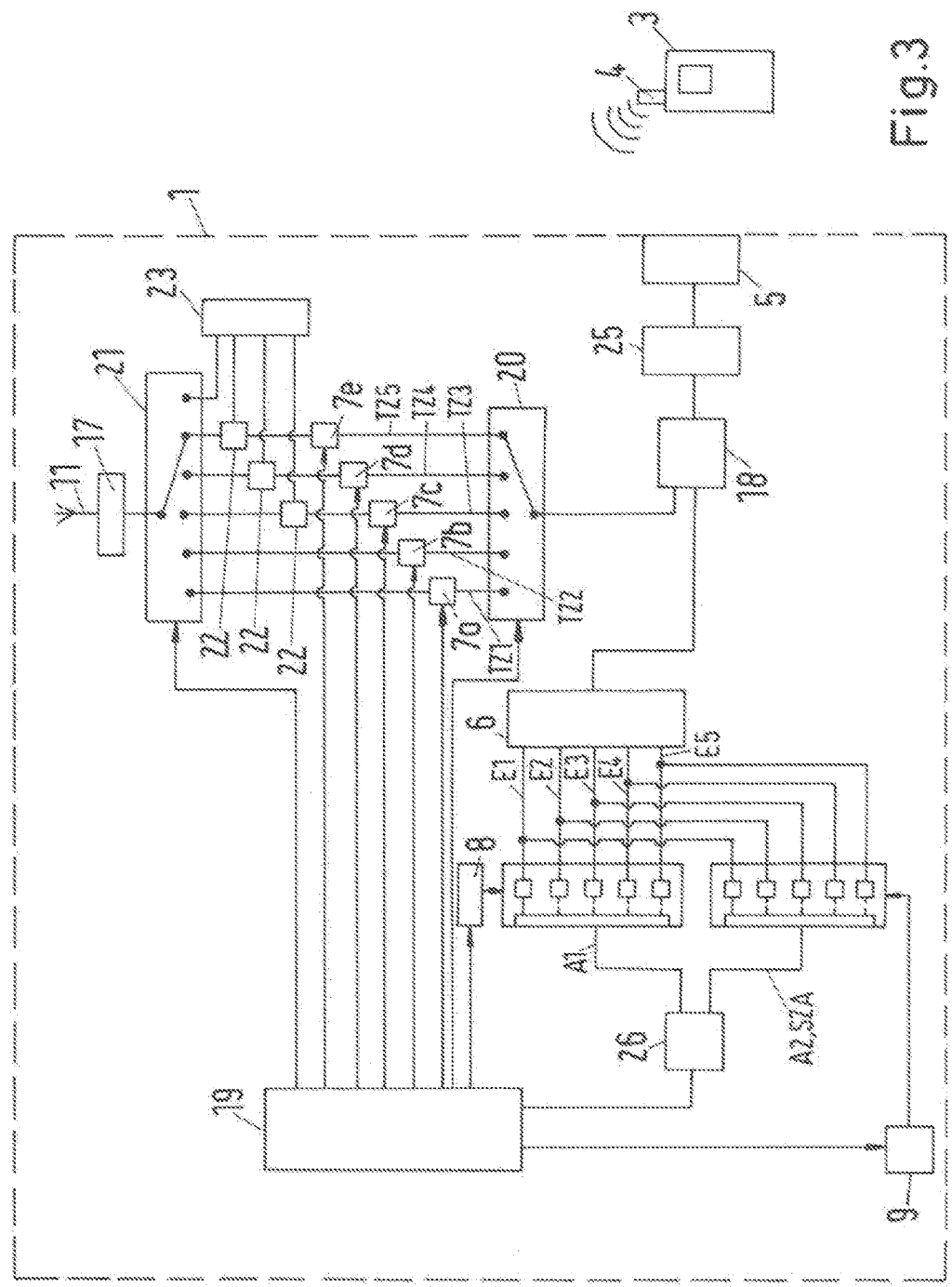
FIG. 3 shows a schematic circuit diagram of a further signal coupling apparatus according to the invention.

FIG. 3 depicts a schematic circuit diagram of a signal coupling device 1 according to the invention in a further embodiment.

In contrast to the signal coupling device 1 depicted in FIG. 2, the further output of the signal branching device 18 is connected to the filter element 6. The filter element 6 filters the transmission signal 4 from the terminal 3 into components with different frequency ranges. The components are then transmitted to the first switching unit S1 and the further switching unit S2 via input signal arms E1, . . . , E5.

Further, corresponding input connections of the first switching unit S1 and of the further switching unit S2 are connected to the same input signal arm E1, . . . , E5.

In this case, an input signal arm E1, . . . , E5 has a common subsection, a branch point, a first subsection and a further subsection, wherein the common subsection branches into the first and further subsections at the branch point, the first subsection being connected to one of the input connections of the first switching unit S1 and the further subsection being connected to a corresponding input connection of the further switching unit S2.

In respect of the further design and operation of the signal coupling device 1 depicted in FIG. 3, reference can be made to the explanations pertaining to FIG. 2.

Figure 4:
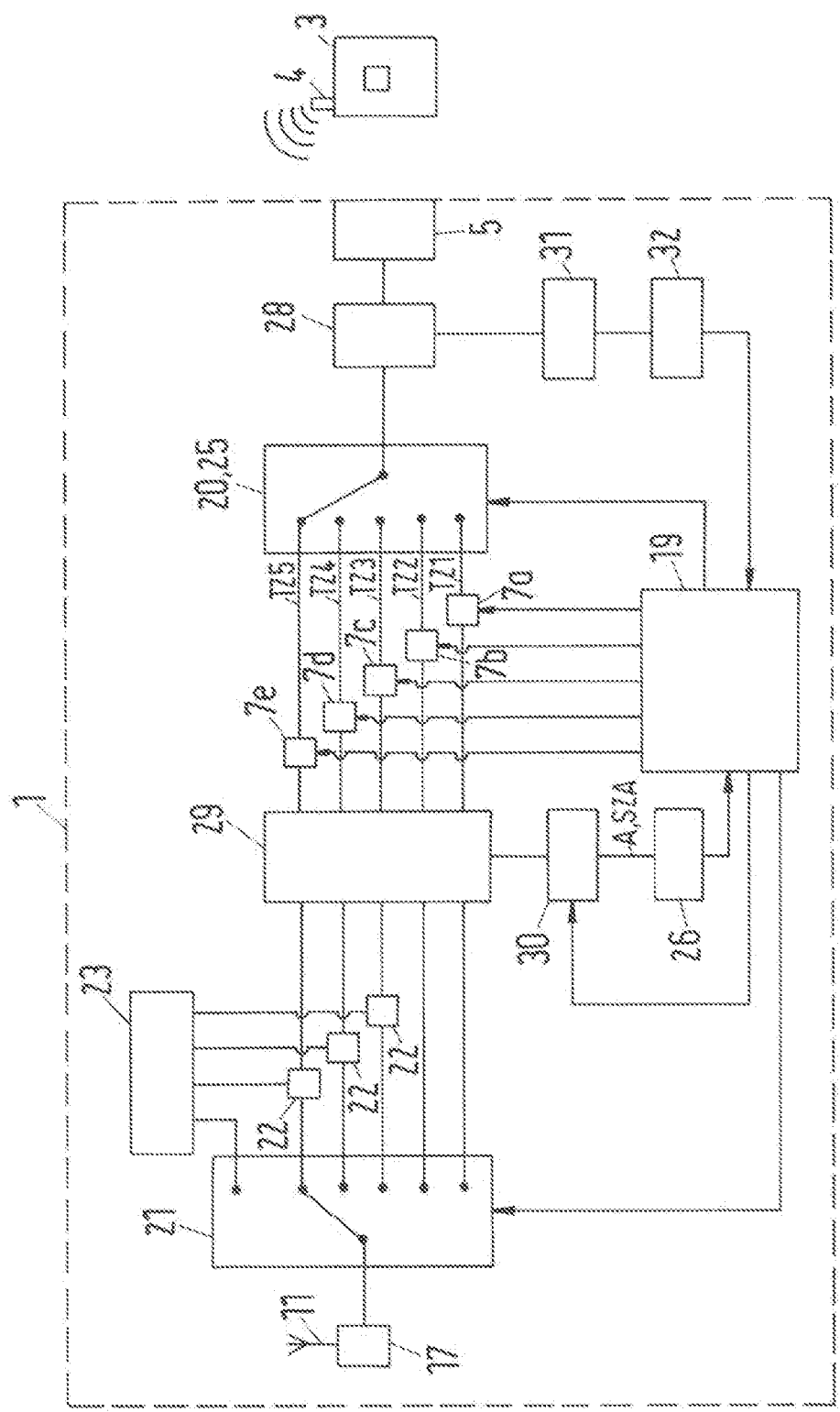
FIG. 4 shows a schematic circuit diagram of a signal coupling apparatus according to the invention in a further embodiment.

FIG. 4 depicts a schematic circuit diagram of a signal coupling apparatus 1 according to the invention in a further embodiment. Like FIG. 1, FIG. 4 also depicts a reception section 23 of the signal coupling device 1 only schematically. The signal coupling device 1 comprises a terminal-end signal interface 5 for receiving the transmission signals 4 from the terminal 3. The signal interface 5 may naturally also be designed such that the signal interface 5 can be used to send signals from the signal coupling device 1 to the terminal 3. The signal interface 5 is connected to a sub-arm switching unit 20 via a coupler device 28. The coupler device 28 decouples part of the transmission signal transmitted from the terminal-end interface 5 to the sub-arm switching unit 20. This will be explained in even more detail below.

The signal coupling apparatus 1 also comprises, like the embodiment depicted in FIG. 1, a filter device 25, which is depicted as a unit with the sub-arm switching unit 20 for the sake of clarity. This unit can also be referred to as a filter switching unit. It goes without saying that the filter device 25 may also be in the form of a component that is separate from the sub-arm switching unit 20. This filter device 25 can comprise, by way of example, one or more duplexing filters that are used for transmitting signals from the terminal-end interface 5 to the antenna 11 and from the antenna 11 to the terminal-end interface 5. The filter device 25 may to this end be connected to the reception section 23 (not depicted). The sub-arm switching unit 20 has a predetermined number of output connections, in this case five output connections. The sub-arm switching unit 20, which is controllable by a control and evaluation device 19, can be used to connect the input connection of the sub-arm switching unit 20, which input connection is connected to the signal interface 5 via the coupling device 28 for signaling purposes, to a selected output connection of the sub-arm switching unit 20 for signaling purposes. In FIG. 4, a fifth output connection is connected to the input connection. Each output connection has a respective sub-arm TZ1, TZ2, TZ3, TZ4, TZ5 connected to it. A first and a second sub-arm TZ1, TZ2 can be used for transmitting time division duplex signals, for example signals in accordance with a GSM standard. A third, a fourth and a fifth sub-arm TZ3, TZ4, TZ5 can be used for transmitting frequency division duplex signals, for example signals in accordance with a UMTS standard or an LTE standard.

In this case, the filter device 25 is designed such that frequency ranges of frequencies that are used for transmitting signals, particularly transmission signals, in accordance with the relevant standards are filtered out of the signal transmitted from the terminal-end interface 5 to the switching filter unit. This can mean that signals at frequencies that are not in the relevant frequency ranges are attenuated.

Each sub-arm TZ1, . . . , TZ5 has a respective amplifier device 7a, 7b, 7c, 7d, 7e arranged in it that is used to amplify the signal present on the relevant sub-arm TZ1, TZ2, TZ5. The amplifier devices 7a, . . . , 7e may in this case be designed like the amplifier devices 7a, . . . , 7e of the embodiment depicted in FIG. 1. The sub-arm switching unit 20 is connected to an antenna switching unit 21 via the sub-arms TZ1, . . . , TZ5. All the sub-arms TZ1, . . . , TZ5 can have amplifier devices 7a, . . . , 7e and a further coupling device 29 arranged in them. Selected sub-arms TZ3, . . . , TZ5 can have duplexing filters 22 arranged in them. The antenna switching unit 21 and the duplexing filters 22 may in this case be designed like the antenna switching unit 21 and the duplexing filters 22 of the embodiment depicted in FIG. 1. The further coupling device 29 decouples part of the signal transmitted via the relevant sub-arm TZ1, . . . , TZ5 from each of the sub-arms TZ1, . . . , TZ5. By way of example, the further coupling device 29 can comprise one coupling unit (not depicted) per sub-arm TZ1, . . . , TZ5, signal outputs of the coupling units being connected in series for signaling purposes. This series connection can be made in line with what is known as a daisychain connection.

The decoupled signal portion is transmitted to a further switching filter unit 30. The further switching filter unit 30 can likewise comprise a filter device, particularly a filter device comprising multiple bandpass filters. This filter device may also be designed such that frequency ranges of frequencies that are used for transmitting signals, particularly transmission signals, via the individual sub-arms TZ1, . . . , TZ5 are filtered out of the signal transmitted from the further coupling device 29 to the further switching filter unit 30. A switching portion of the switching filter unit 30 can switch individual filters, particularly one of the bandpass filters explained, into a signal arm between the input and output connections of the switching filter unit 30.

An output signal arm A of the further switching filter unit 30 therefore has a portion of a signal that is transmitted via one of the sub-arms TZ1, . . . , TZ5 present on it. This output signal arm A of the further switching filter unit 30 forms the detection signal arm section SZA. The depiction further shows that the further filter switching unit 30 is connected to the control and evaluation device 19 via the output signal arm A and a detector device 26. The detector device 26 produces an output signal that is dependent on a signal level of a signal present on the output signal arm A. In particular, the output signal from the detector device 26 may be an analog (voltage) signal, the amplitude of which is proportional to the signal level.

The amplifier devices 7a, . . . , 7e are controllable, particularly activable and deactivable, by the control and evaluation device 19. The sub-arm switching unit 20, the antenna switching unit 21 and the further switching filter unit 30 are controllable by the control and evaluation device 19, in particular the switching states thereof are adjustable.

The control and evaluation device 19 evaluates a time profile of a signal level of the signal present on the output signal arm A and determines whether a time division duplex signal or a frequency division duplex signal is available. The signal type is then taken as a basis for controlling the sub-arm switching unit 20 and the antenna switching unit 21. Further, the further switching filter unit 30 can also be controlled by the control and evaluation device 19 on the basis of the signal type. Further, a standard of a communication taking place using the signal present on the output signal arm A can be determined. In this regard, reference can be made to the explanations pertaining to the embodiment depicted in FIG. 1, which also apply to the embodiment depicted in FIG. 4.

Further, the control and evaluation device 19 can be used to estimate a future signal profile of the signal present on the output signal arm A. Further, the control and evaluation device 19 can take the future signal profile as the basis for controlling the relevant amplifier device 7a, 7b and also the sub-arm switching unit 20 and/or the antenna switching unit 21. If need be, it is also possible for the further filter switching unit 30 to be controlled by the control and evaluation device on the basis of the future signal profile. In this regard, reference can likewise be made to the explanations pertaining to the embodiment depicted in FIG. 1, which also apply to the embodiment depicted in FIG. 4.

Further, the signal coupling apparatus 1 comprises a further filter device 31. This can also comprise multiple bandpass filters. Further, the further filter device 31 may be designed such that frequency ranges of frequencies that are used for transmitting signals, particularly transmission signals, via the individual sub-arms TZ1, . . . , TZ5 or transmission signals in accordance with the standards explained are filtered out of the signal transmitted from the coupling device 28 to the further filter device 31. The further filter device 31 is connected to a further detector device 32 for signaling purposes. The latter can produce an output signal that is dependent on a signal level of a signal that is transmitted from the further filter device 31 to the further detector device 32. In particular, this output signal from the further detector device 31 may also be an analog (voltage) signal, the amplitude of which is proportional to the signal level. The control and evaluation device 19, which is connected to the further detector device 32 for signaling purposes, evaluates a time profile of the signal level and determines whether a transmission signal is transmitted from the terminal 3 to the sub-arm switching unit 20. Therefore, the partial circuit that consists of the coupling device 28, the further filter device 31 and the further detector device 32 is used for detecting whether a transmission signal is transmitted by the terminal 3.

When a transmitted transmission signal is detected, the evaluation and control device 19 can actuate the sub-arm switching unit 20, the antenna switching unit 21 and the further filter switching unit 30 in sync such that each sub-arm TZ1, . . . , TZ5 is coupled to the output signal arm A in succession. In this way, detection of the currently activated sub-arm TZ1, . . . , TZ5 can be initiated and performed. When the currently activated sub-arm TZ1, . . . , TZ5 is detected, the detection can be terminated and the currently activated sub-arm can be connected to the output signal arm A. When no further transmitted transmission signal is detected, the most recently activated sub-arm can remain connected to the output signal arm. Fresh detection can be initiated and performed when a transmitted transmission signal is detected again.

The invention claimed is:

1. A method for operating a signal coupling device, the signal coupling device having at least one signal arm section that is connected or connectable for signaling purposes to a terminal-end interface of the signal coupling device, which comprises the steps of:
- determining at least one signal property of a signal present on the at least one signal arm section;
- using the at least one signal property as a basis for determining a signal type, the signal type determined is a time division duplex signal or a frequency division duplex signal;
- effecting a signal-type-specific control of a mode of at least one signal processing device;
- estimating a future signal profile of the signal that is present, the signal-type-specific control of the at least one signal processing device is effected on a basis of an estimated time profile; and
- connecting a switching unit to the terminal-end interface via a first group of at least two input signal arms, wherein the at least one signal arm section forms an output signal arm of the switching unit or is connected to the output signal arm, wherein the switching unit connects a selected input signal arm from the first group of at least two input signal arms to the output signal arm.

2. The method according to claim 1, which further comprises taking the signal type as a basis for setting up a signal-type-specific connection between the terminal-end interface and an antenna-end interface of the signal coupling device.

3. The method according to claim 1, wherein the signal processing device is an amplifier device.

4. The method according to claim 1, which further comprises:
- determining a standard of a communication being effected using the signal that is present; and
- determining the future signal profile on a basis of previously known properties of the standard.

5. The method according to claim 1, which further comprises:
- determining a discrepancy in an estimated signal profile from an actually arising signal profile; and
- performing a fresh estimation of the future signal profile if the discrepancy is greater than a predetermined extent.

6. The method according to claim 1, which further comprises:
- connecting a first switching unit to the terminal-end interface via at least two of the input signal arms, the first switching unit connects the selected input signal arm from the first group of input signal arms to an output signal arm of the first switching unit; and
- connecting a second switching unit to the terminal-end interface via at least two of the input signal arms of a second group of input signal arms, wherein a selected input signal arm from the second group of input signal arms is connected to an output signal arm of the second switching unit, wherein the at least one signal arm section forms the output signal arm of the second switching unit or is connected to the output signal arm of the second switching unit.

7. The method according to claim 1, which further comprises determining an activated input signal arm, the activated input signal arm being connected to the output signal arm of the switching unit.

8. The method according to claim 1, which further comprises connecting the terminal-end interface to a selected sub-arm from a group of at least two sub-arms, wherein the terminal-end interface is connectable to an antenna-end interface via each of the sub-arms from the group of at least two sub-arms, wherein the at least one signal arm section is connected to the selected sub-arm.

9. The method according to claim 1, which further comprises using a device for detecting a transmission signal to detect a transmission signal transmitted by the terminal-end interface.

10. A method for operating a signal coupling device, the signal coupling device having at least one signal arm section that is connected or connectable for signaling purposes to a terminal-end interface of the signal coupling device, which comprises the steps of:
- determining at least one signal property of a signal present on the at least one signal arm section;
- using the at least one signal property as a basis for determining a signal type, the signal type determined is a time division duplex signal or a frequency division duplex signal;
- effecting a signal-type-specific control of a mode of at least one signal processing device;
- estimating a future signal profile of the signal that is present, the signal-type-specific control of the at least one signal processing device is effected on a basis of an estimated time profile;
- determining a standard of a communication being effected using the signal that is present; and
- determining the future signal profile on a basis of previously known properties of the standard.

11. The method according to claim 10, which further comprises taking the signal type as a basis for setting up a signal-type-specific connection between the terminal-end interface and an antenna-end interface of the signal coupling device.

12. The method according to claim 10, wherein the signal processing device is an amplifier device.

13. The method according to claim 10, which further comprises connecting a switching unit to the terminal-end interface via a first group of at least two input signal arms, wherein the at least one signal arm section forms an output signal arm of the switching unit or is connected to the output signal arm, wherein the switching unit connects a selected input signal arm from the first group of at least two input signal arms to the output signal arm.

14. The method according to claim 13, which further comprises:
- connecting a first switching unit to the terminal-end interface via at least two of the input signal arms, the first switching unit connects the selected input signal arm from the first group of input signal arms to an output signal arm of the first switching unit; and
- connecting a second switching unit to the terminal-end interface via at least two of the input signal arms of a second group of input signal arms, wherein a selected input signal arm from the second group of input signal arms is connected to an output signal arm of the second switching unit, wherein the at least one signal arm section forms the output signal arm of the second switching unit or is connected to the output signal arm of the second switching unit.

15. The method according to claim 13, which further comprises determining an activated input signal arm, the activated input signal arm being connected to the output signal arm of the switching unit.

16. The method according to claim 10, which further comprises:
- determining a discrepancy in an estimated signal profile from an actually arising signal profile; and performing a fresh estimation of the future signal profile if the discrepancy is greater than a predetermined extent.

17. The method according to claim 10, which further comprises connecting the terminal-end interface to a selected sub-arm from a group of at least two sub-arms, wherein the terminal-end interface is connectable to an antenna-end interface via each of the sub-arms from the group of at least two sub-arms, wherein the at least one signal arm section is connected to the selected sub-arm.

18. The method according to claim 10, which further comprises using a device for detecting a transmission signal to detect a transmission signal transmitted by the terminal-end interface.

19. A method for operating a signal coupling device, the signal coupling device having at least one signal arm section that is connected or connectable for signaling purposes to a terminal-end interface of the signal coupling device, which comprises the steps of:
   determining at least one signal property of a signal present on the at least one signal arm section;
   using the at least one signal property as a basis for determining a signal type, the signal type determined being a time division duplex signal or a frequency division duplex signal;
   effecting a signal-type-specific control of a mode of at least one signal processing device;
   estimating a future signal profile of the signal present on the at least one signal arm section, the signal-type-specific control of the at least one signal processing device being effected based on an estimated time profile;
   determining at least one time selected from the group consisting of a starting time of at least one future transmission time period and an ending time of the at least one future transmission time period; and
   controlling the mode of the at least one signal processing device based on at least one time selected from the group consisting of the starting time and the ending time, wherein the at least one signal processing device is activated at a time before a beginning of the future transmission time period and deactivated at a time after the future transmission time period.

20. A signal coupling device, comprising:
   a terminal-end interface;
   at least one signal arm section that is connected or connectable for signaling purposes to said terminal-end interface; and
   at least one control and evaluation device for determining at least one signal property of a signal present on said at least one signal arm section, the at least one signal property taken as a basis for determining a signal type being a time division duplex signal or a frequency division duplex signal;
   said control and evaluation device configured for taking the signal type as a basis for setting a signal-type-specific mode of at least one signal processing device;
   said control and evaluation device configured for estimating a future signal profile of the signal that is present, and for setting a signal-type-specific control of the at least one signal processing device based on an estimated time profile;
   said control and evaluation device configured for determining at least one time selected from the group consisting of a starting time of at least one future transmission time period and an end time of the at least one future transmission time period;
   said control and evaluation device configured for controlling a mode of the at least one signal processing device based on at least one time selected from the group consisting of: the starting time and the ending time; and
   said control and evaluation device configured for activating the at least one signal processing device at a time before a beginning of the future transmission time period and for deactivating the at least one signal processing device at a time after the transmission time period.

* * * * *